(12) United States Patent
Kurimoto et al.

(10) Patent No.: US 10,158,150 B2
(45) Date of Patent: Dec. 18, 2018

(54) ASSEMBLED BATTERY REUSING SYSTEM, AND APPARATUS FOR ASSEMBLED BATTERY REUSING SYSTEM

(71) Applicant: TOYOTA JIDOSHA KABUSHIKI KAISHA, Toyota-shi, Aichi-ken (JP)

(72) Inventors: Yasuhide Kurimoto, Kasugai (JP); Kazuo Tojima, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/027,372

(22) PCT Filed: Sep. 24, 2014

(86) PCT No.: PCT/IB2014/001917
§ 371 (c)(1),
(2) Date: Apr. 5, 2016

(87) PCT Pub. No.: WO2015/052561
PCT Pub. Date: Apr. 16, 2015

(65) Prior Publication Data
US 2016/0248130 A1 Aug. 25, 2016

(30) Foreign Application Priority Data
Oct. 7, 2013 (JP) .................................. 2013-210127

(51) Int. Cl.
*H01M 10/54* (2006.01)
*H01M 10/42* (2006.01)

(52) U.S. Cl.
CPC ....... *H01M 10/54* (2013.01); *H01M 10/4207* (2013.01); *H01M 2220/20* (2013.01); *Y02W 30/84* (2015.05)

(58) Field of Classification Search
CPC ... H01M 10/54; H01M 10/42; H01M 10/4207
See application file for complete search history.

(56) References Cited

U.S. PATENT DOCUMENTS

| 2004/0113588 A1 | 6/2004 | Mikuriya et al. |
| 2013/0015702 A1 | 1/2013 | Ito |
| 2013/0090872 A1* | 4/2013 | Kurimoto ............. B60L 3/0046 702/63 |

FOREIGN PATENT DOCUMENTS

| CN | 103081213 A | 5/2013 |
| JP | 4033130 B2 | 11/2007 |
| JP | 2012-109260 A | 6/2012 |
| JP | 5044862 B2 | 7/2012 |
| JP | 2012-173928 A | 9/2012 |
| JP | 5462689 B2 | 1/2014 |
| WO | 2011/121755 A1 | 10/2011 |
| WO | 2011/162014 A1 | 12/2011 |

* cited by examiner

*Primary Examiner* — Miriam Stagg
*Assistant Examiner* — Victoria H Lynch
(74) *Attorney, Agent, or Firm* — Sughrue Mion, PLLC (57) ABSTRACT

An assembled battery reusing system for reusing an assembled battery including a plurality of single cells is provided. The rebuild candidate determining unit (430) determines based on the information about the assembled battery whether a retrieved assembled battery is a rebuild candidate, and the information is acquired by the assembled battery information acquisition unit (i.e. communication unit) (420). The single cell amount determining unit (440) determines an amount of rebuilding-usable single cells included in the rebuild-candidate assembled battery determined by the rebuild candidate determining unit (430). The assembled battery demand information acquisition unit (460) acquires an amount of rebuilding-required single cells required to rebuild a required new assembled battery. The determination unit (470) determines based on the determined amount of rebuilding-usable single cells and the acquired amount of rebuilding-required single cells whether to send the rebuild-candidate assembled battery to a rebuilding process.

7 Claims, 7 Drawing Sheets

EXAMPLE OF ASSEMBLED BATTERY INFORMATION

| | |
|---|---|
| INFORMATION ABOUT ASSEMBLED BATTERY (BATTERY PACK) | TRAVEL DISTANCE |
| | TOTAL DISCHARGE ELECTRICITY |
| | BATTERY TEMPERATURE FREQUENCY DISTRIBUTION |
| INFORMATION ABOUT EACH INDIVIDUAL SINGLE CELL (MODULE) | VOLTAGE |
| | INTERNAL RESISTANCE |
| | VARIATIONS IN VOLTAGE AMONG SINGLE CELLS |
| | VARIATIONS IN INTERNAL RESISTANCE AMONG SINGLE CELLS |
| OTHER INFORMATION | TEMPERATURE OVERLOAD, etc. |

FIG. 6

EXAMPLE OF DISASSEMBLING/INSPECTION PROCESS FOR REBUILDING

| |
|---|
| CHECK ASSEMBLED BATTERY (BATTERY PACK) |
| DISASSEMBLE ASSEMBLED BATTERY INTO SINGLE CELLS (MODULES) |
| INSPECT APPEARANCE, QUALITY, etc. OF EACH SINGLE CELL |
| ADJUST EACH INDIVIDUAL SINGLE CELL TO STATE ALLOWED TO BE SHIPPED |

FIG. 7

ASSEMBLED BATTERY REUSING SYSTEM, AND APPARATUS FOR ASSEMBLED BATTERY REUSING SYSTEM

BACKGROUND OF THE INVENTION

1. Field of the Invention

The invention relates to an assembled battery reusing system and an apparatus that is used in the assembled battery reusing system.

2. Description of Related Art

In recent years, a hybrid vehicle, an electric vehicle, and the like, that travel by utilizing electric energy are practically used. Such vehicles include electrical storage devices. The electrical storage devices, for example, include assembled batteries each formed by assembling a plurality of cells for obtaining a desired capacity.

The assembled batteries degrade with time through usage. Therefore, maintenance of the assembled batteries is carried out at appropriate timing. In maintenance, for example, the assembled batteries are removed from the vehicles, and new assembled batteries are mounted on the vehicles. Some of the removed assembled batteries are retrieved for reusing, which is, for example, described in International Application Publication No. 2011/162014.

There are mainly three options for reusing assembled batteries; reusing, rebuilding, and recycling. In the case of reusing, retrieved assembled batteries are subjected to shipping inspection, and then directly shipped as reused products. In the case of rebuilding, retrieved assembled batteries are once disassembled into single cells. Among the disassembled single cells, directly usable single cells are assembled together, and new assembled batteries are manufactured. The newly manufactured assembled batteries are subjected to shipping inspection, and are shipped as rebuild products. In the case of recycling, assembled batteries are disassembled and recycled.

In reusing assembled batteries, rebuilding requires the process of disassembling assembled batteries into single cells, the process of inspecting single cells one by one, and the like, so cost increases.

SUMMARY OF THE INVENTION

The invention provides an assembled battery reusing system and an apparatus for an assembled battery reusing system, which are able to reduce cost that is required to rebuild assembled batteries.

An aspect of the invention provides an assembled battery reusing system for reusing an assembled battery including a plurality of single cells. The assembled battery reusing system includes an assembled battery information acquisition unit, a rebuild candidate determining unit, a single cell amount determining unit, an assembled battery demand information acquisition unit, and a determination unit. The assembled battery information acquisition unit is configured to acquire information about an assembled battery. The rebuild candidate determining unit is configured to determine based on the information about the assembled battery whether a retrieved assembled battery is a rebuild candidate. The information is acquired by the assembled battery information acquisition unit. The single cell amount determining unit is configured to determine an amount of rebuilding-usable single cells included in the rebuild-candidate assembled battery determined by the rebuild candidate determining unit. The assembled battery demand information acquisition unit is configured to acquire an amount of rebuilding-required single cells required to rebuild a required new assembled battery. The determination unit is configured to determine based on the amount of the amount of rebuilding-usable single cells and the amount of rebuilding-required single cells whether to send the rebuild-candidate assembled battery to a rebuilding process. The amount of the rebuilding-usable single cells is determined by the single cell amount determining unit. The amount of rebuilding-required single cells is acquired by the assembled battery demand information acquisition unit.

In the assembled battery reusing system, the information about the assembled battery may be collectable in advance before the assembled battery is retrieved. The rebuilding process may include an inspection process for obtaining information that is not included in the information about the assembled battery.

In the assembled battery reusing system, the assembled battery reusing system may further include a storage unit configured to store the amount of rebuilding-usable single cells included in each individual rebuild-candidate assembled battery of a plurality of the rebuild-candidate assembled batteries, and the amount of rebuilding-usable single cells may be determined by the single cell amount determining unit. The determination unit may be configured to determine based on the amount of rebuilding-usable single cells of a corresponding one of the rebuild-candidate assembled batteries and the amount of rebuilding-required single cells whether to send each individual rebuild-candidate assembled battery of the plurality of rebuild-candidate assembled batteries to the rebuilding process, and the amount of rebuilding-usable single cells of the corresponding one of the rebuild-candidate assembled batteries may be stored in the storage unit.

The determination unit may be configured to determine to preferentially send the assembled battery to the rebuilding process in descending order of the amount of rebuilding-usable single cells among the plurality of rebuild-candidate assembled batteries.

Another aspect of the invention provides an assembled battery reusing system for reusing an assembled battery including a plurality of single cells. The assembled battery reusing system includes a controller. The controller is configured to: (a) acquire information about an assembled battery; (b) determine whether a retrieved assembled battery is a rebuild candidate based on the acquired information about the assembled battery; (c) determine an amount of rebuilding-usable single cells included in the determined rebuild-candidate assembled battery; (d) acquire an amount of rebuilding-required single cells required to rebuild a required new assembled battery; and (e) determine based on the determined amount of rebuilding-usable single cells and the acquired amount of rebuilding-required single cells whether to send the rebuild-candidate assembled battery to a rebuilding process.

Further another aspect of the invention provides an apparatus that is used in an assembled battery reusing system for reusing an assembled battery including a plurality of single cells. The apparatus includes an assembled battery information acquisition unit, a rebuild candidate determining unit, a single cell amount determining unit, an assembled battery demand information acquisition unit, and a determination unit. The assembled battery information acquisition unit is configured to acquire information about an assembled battery. The rebuild candidate determining unit is configured to determine based on the information about the assembled battery whether a retrieved assembled battery is a rebuild candidate. The information is acquired by the assembled battery information acquisition unit. The single cell amount determining unit is configured to determine an amount of rebuilding-usable single cells included in the rebuild-candidate assembled battery determined by the rebuild candidate determining unit. The assembled battery demand information acquisition unit is configured to acquire an amount of rebuilding-required single cells required to rebuild a required new assembled battery. The determination unit is configured to determine based on the amount of the amount of rebuilding-usable single cells and the amount of rebuilding-required single cells whether to send the rebuild-candidate assembled battery to a rebuilding process. The amount of the rebuilding-usable single cells is determined by the single cell amount determining unit. The amount of rebuilding-required single cells is acquired by the assembled battery demand information acquisition unit.

Yet another aspect of the invention provides an apparatus that is used in an assembled battery reusing system for reusing an assembled battery including a plurality of single cells. The apparatus includes a controller. The controller is configured to: (a) acquire information about an assembled battery; (b) determine whether a retrieved assembled battery is a rebuild candidate based on the acquired information about the assembled battery; (c) determine an amount of rebuilding-usable single cells included in the determined rebuild-candidate assembled battery; (d) acquire an amount of rebuilding-required single cells required to rebuild a required new assembled battery; and (e) determine based on the determined amount of rebuilding-usable single cells and the acquired amount of rebuilding-required single cells whether to send the rebuild-candidate assembled battery to a rebuilding process.

With the thus configured assembled battery reusing system and the apparatus that is used in this system, it is determined based on the amount of rebuilding-usable single cells included in the rebuild-candidate assembled battery and the amount of rebuilding-required single cells whether to send the assembled battery to the rebuilding process. Thus, it is possible to send only an appropriate amount of assembled batteries to the rebuilding process. As a result, it is possible to minimize cost for rebuilding an assembled battery, that is, it is possible to reduce cost associated with rebuilding of an assembled battery.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, an embodiment of the invention will be described in detail with reference to the accompanying drawings. Like reference numerals denote the same or corresponding portions in the drawings, and the description thereof will not be repeated.

Figure 1:
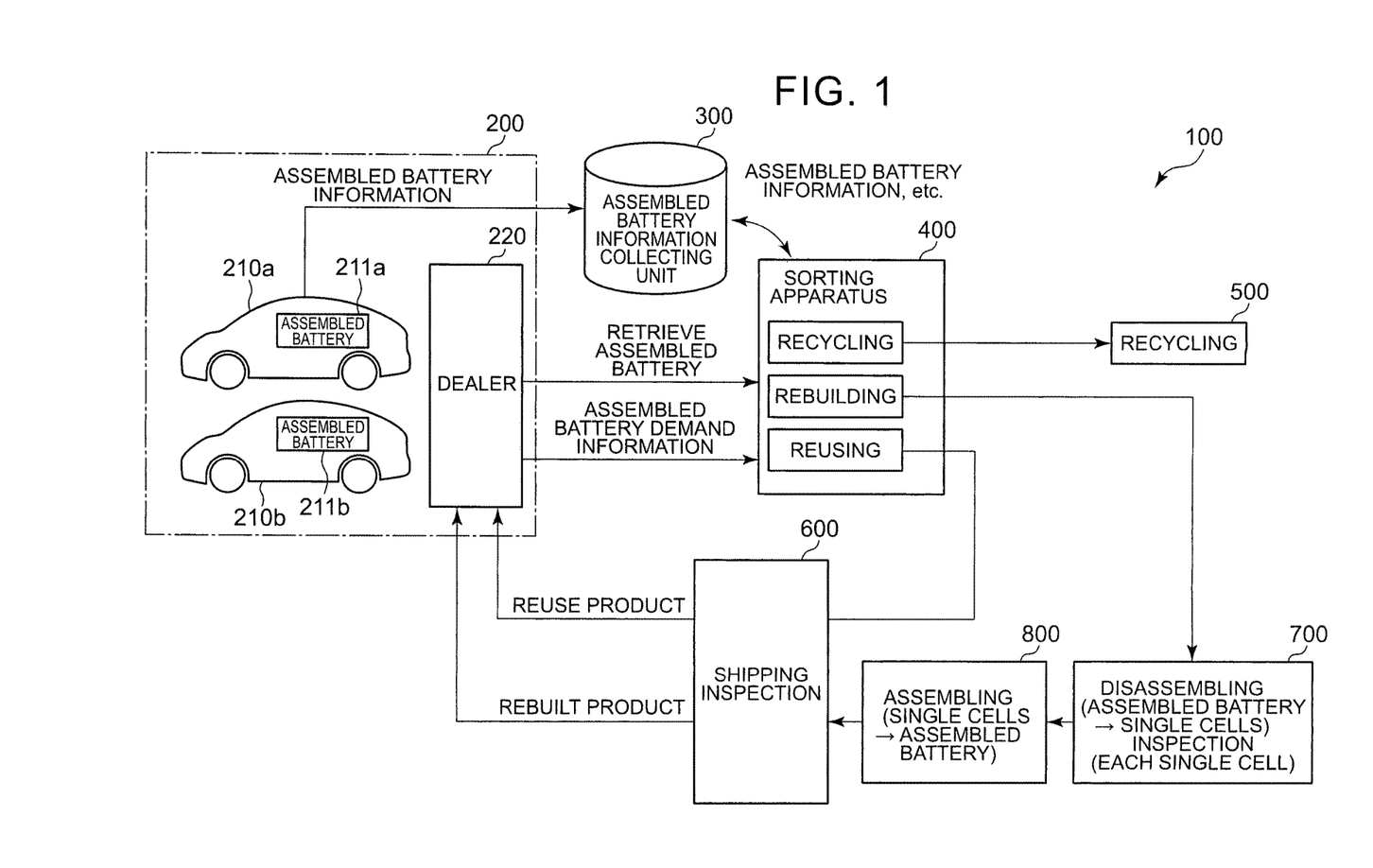
FIG. 1 is a view that shows the schematic configuration of an assembled battery reusing system according to an embodiment of the invention.

FIG. 1 is a view that shows the schematic configuration of an assembled battery reusing system 100 according to the embodiment. As shown in FIG. 1, in a market 200, assembled batteries are used to, for example, propel hybrid vehicles, electric vehicles (hereinafter, simply referred to as "vehicles"), and the like. In FIG. 1, assembled batteries 211a, 211b are respectively used in vehicles 210a, 210b. The number of vehicles and the number of assembled batteries shown in FIG. 1 are one example, and it should be understood that there are a large number of vehicles and a large number of assembled batteries in the actual market. In the embodiment, reusing of the assembled battery 211a will be mainly described. Reusing of assembled batteries other than the assembled battery 211a, for example, the assembled battery 211b, is similar to that of the assembled battery 211a, so the description will not be repeated.

The assembled battery 211a is formed by assembling a plurality of single cells together. The assembled battery 211a can be, for example, mounted on the vehicle 210a as part of an electrical storage device (not shown). The electrical storage device can monitor the assembled battery 211a, and can acquire information about the assembled battery 211a (assembled battery information). The assembled battery information that is acquired by the electrical storage device is transmitted to an assembled battery information collecting unit 300. The assembled battery information includes information about the characteristic, or the like, of the assembled battery and identification information for identifying the assembled battery. The details of the assembled battery information will be described later with reference to FIG. 5. The assembled battery information is, for example, transmitted by communication of the vehicle 210a (or the electrical storage device) with the assembled battery information collecting unit 300. The assembled battery information may be once acquired at a dealer 220 from the vehicle 210a or the electrical storage device, and then may be transmitted from the dealer 220 to the assembled battery information collecting unit 300. Not the electrical storage device but the assembled battery 211a itself may be configured to acquire the assembled battery information and transmit the assembled battery information to the assembled battery information collecting unit 300.

The dealer 220, for example, sells and/or maintains vehicles and assembled batteries. In maintenance, for example, the assembled battery 211a is removed from the vehicle 210a, and a new assembled battery is mounted on the vehicle 210a. The removed assembled battery 211a may be retrieved from the market 200 for reusing. The assembled battery 211a is, for example, retrieved by the dealer 220. A new assembled battery that is mounted on the vehicle 210a is, for example, supplied by the dealer 220.

The assembled battery 211a retrieved from the market 200 is, for example, sent to a sorting apparatus 400 by the dealer 220. Information about demand for a new assembled battery (assembled battery demand information) is, for example, transmitted from the dealer 220 to the sorting apparatus 400. The sorting apparatus 400 sorts the retrieved assembled battery 211a into recycling, reusing and rebuilding.

Specifically, when it is determined that all the single cells included in the assembled battery 211a are not usable, the sorting apparatus 400 sorts the assembled battery 211a into a recycling assembled battery. In this case, the assembled battery 211a is, for example, disassembled into material units, and recycled (500 in FIG. 1). When it is determined that the assembled battery 211a is directly usable as an assembled battery, the sorting apparatus 400 sorts the assembled battery 211a into a reusing assembled battery. In this case, the assembled battery 211a is subjected to shipping inspection (600 in FIG. 1) without disassembling, and can be shipped as a reuse product. The reuse product, for example, sells at the dealer 220, and is mounted on a vehicle and used in the market 200. The reuse product may be used as another power supply other than mounted on a vehicle and used.

When it is determined that part of single cells are usable among the plurality of single cells included in the assembled battery 211a, the sorting apparatus 400 sorts the assembled battery 211a to one of a recycling assembled battery and an assembled battery that is used for rebuilding. When the assembled battery 211a is sorted to an assembled battery that is used for rebuilding, the assembled battery 211a is disassembled into single cells, and the single cells determined to be usable are subjected to inspection (700 in FIG. 1). After that, only the single cells that have passed the inspection are assembled together, and a new assembled battery is manufactured (800 in FIG. 1). The new assembled battery is subjected to shipping inspection (600 in FIG. 1), and then can be shipped as a rebuilt product. The rebuilt product, as well as the reuse product, is, for example, mounted on a vehicle and used in the market 200. The rebuilt product may be used as another power supply other than mounted on a vehicle and used. The disassembled single cells may be used as an assembled battery as another power supply by assembling a selected number of the single cells. The sorting apparatus 400 may have a plurality of determination criteria on which to determine whether each individual single cell is usable. Thus, for example, low-grade single cells that are not reusable as single cells for a vehicle may be assembled together, and used as a power supply for another application.

Figure 2:
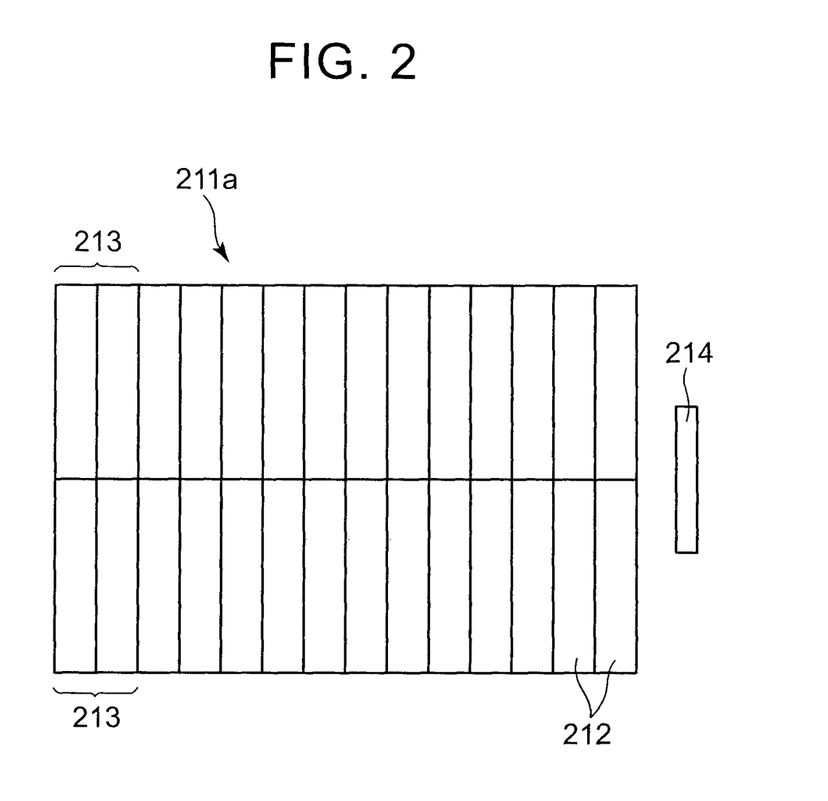
FIG. 2 is a view for illustrating an example of the configuration of an assembled battery in the embodiment.

FIG. 2 is a view for illustrating an example of the configuration of the assembled battery 211a shown in FIG. 1. As shown in FIG. 2, the assembled battery 211a is a battery pack including a plurality of single cells 212. Each single cell 212 is, for example, a battery module in which a plurality of cells of nickel-metal hydride rechargeable battery (Ni-MH battery) are modularized. Each single cell may be not a battery module but a unit cell of a nickel-metal hydride rechargeable battery. In the example shown in FIG. 2, a single battery block (or "stack") 213 is formed of two modules. In this case, the assembled battery 211a is formed of the fourteen battery blocks 213. Therefore, the assembled battery 211a includes the twenty-eight single cells 212. Each single cell 212 may be formed of a cell or module of a lithium ion battery (Li ion battery). A tag 214 can be attached to the assembled battery 211a. Identification information, such as a serial number of the assembled battery 211a, can be stored in the tag 214.

Figure 3:
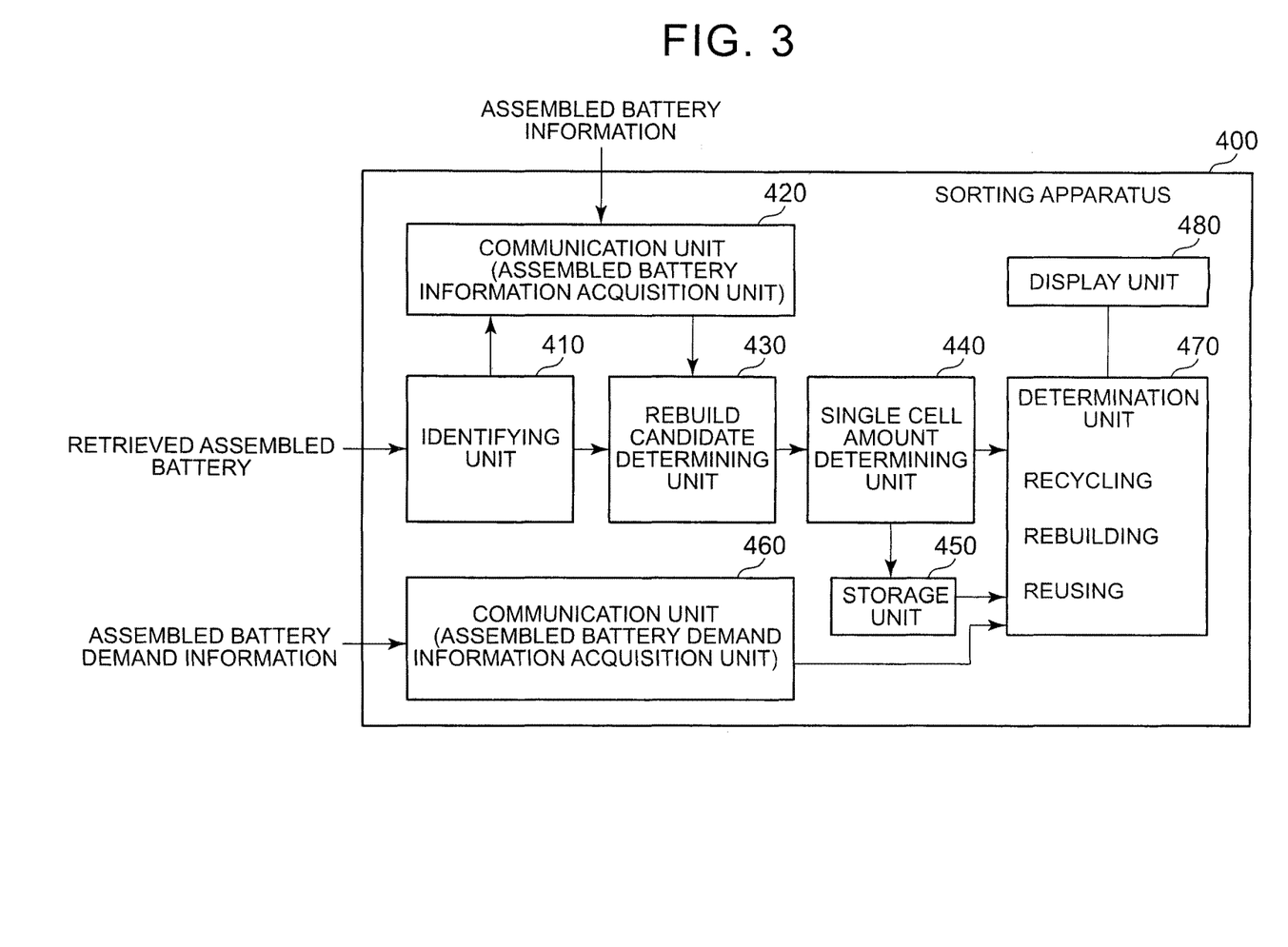
FIG. 3 is a view for illustrating an example of the configuration of a sorting apparatus shown in FIG. 1.

FIG. 3 is a view for illustrating an example of the configuration of the sorting apparatus 400 shown in FIG. 1. As shown in FIG. 3, the sorting apparatus 400 includes an identification unit 410, a communication unit 420, a rebuild candidate determining unit 430, a single cell amount determining unit 440, a storage unit 450, a communication unit 460, a determination unit 470, and a display unit 480. The above-described communication unit (420), rebuild candidate determining unit, single cell amount determining unit, storage unit, communication unit (460), determination unit, and the like, may be implemented by a controller provided in the sorting apparatus 400.

The identification unit 410 identifies a retrieved assembled battery. Here, the identification information of the assembled battery 211a shown in FIG. 1 is acquired as an example, and the assembled battery 211a is identified. The identification information is, for example, acquired by reading the information stored in the tag 214 shown in FIG. 2. The acquired identification information is transmitted to the communication unit 420.

The communication unit 420 is an assembled battery information acquisition unit that acquires assembled battery information. The communication unit 420, for example, communicates with the assembled battery information collecting unit 300 shown in FIG. 1, and acquires the assembled battery information collected by the assembled battery information collecting unit 300. The communication unit 420 acquires the assembled battery information of the assembled battery 211a from the assembled battery information collecting unit 300 based on the identification information transmitted from the identification unit 410. The communication unit 420 may acquire the assembled battery information not from the assembled battery information collecting unit 300 but directly from the retrieved assembled battery 211a. In this case, the communication unit 420, for example, reads the assembled battery information stored in the tag 214 (FIG. 2) of the assembled battery 211a. The acquired assembled battery information is transmitted to the rebuild candidate determining unit 430.

The rebuild candidate determining unit 430 determines whether the retrieved assembled battery 211a is a rebuild candidate based on the assembled battery information transmitted from the communication unit 420. The "rebuild candidate" means an assembled battery that is usable for rebuilding. The rebuild-candidate assembled battery may be used for rebuilding later or may be, for example, recycled other than rebuilding. When it is determined that part of the single cells included in the assembled battery 211a are usable, the rebuild candidate determining unit 430 determines the assembled battery 211a as the rebuild-candidate assembled battery. Otherwise, the rebuild candidate determining unit 430 determines the assembled battery 211a as a recycling assembled battery or a reusing assembled battery. The details of the above-described determination based on the assembled battery information will be described later with reference to FIG. 5. Hereinafter, the case where the assembled battery 211a is determined as the rebuild-candidate assembled battery will be described.

The single cell amount determining unit 440 determines the amount of rebuilding-usable single cells included in the assembled battery 211a (hereinafter, may be referred to as "the amount of usable single cells"). The amount of usable single cells may be, for example, the number of rebuilding-usable single cells or the number of rebuilding-usable battery blocks. The amount of usable single cells may be the ratio of rebuilding-usable single cells or rebuilding-usable battery blocks to the single cells included in the assembled battery. In the embodiment, the amount of usable single cells encompasses all the meaning of them. As will be described in detail later with reference to FIG. 8, the amount of usable single cells is determined based on the assembled battery information.

The storage unit 450 stores the amount of usable single cells included in the assembled battery 211a and determined by the single cell amount determining unit 440. The storage unit 450 stores the amount of usable single cells included in the assembled battery 211a in association with the assembled battery 211a. For a rebuild-candidate assembled battery other than the assembled battery 211a as well, the storage unit 450 stores the amount of usable single cells included in the assembled battery in association with the assembled battery. The information stored in the storage unit 450 is read by the determination unit 470 (described later).

The communication unit 460 is an assembled battery demand information acquisition unit that acquires information about demand for a new assembled battery (hereinafter, referred to as "assembled battery demand information"). The communication unit 460, for example, communicates with the dealer 220 shown in FIG. 1, and acquires the assembled battery demand information. The assembled battery demand information is, for example, information about demand for an assembled battery in the market 200 shown in FIG. 1. As one example, the assembled battery demand information indicates demand for a rebuilt assembled battery. Alternatively, the assembled battery demand information is information indicating the amount of single cells that are required to manufacture a required rebuilt assembled battery. The assembled battery demand information acquired by the communication unit 460 is transmitted to the determination unit 470.

The determination unit 470 determines based on the amount of usable single cells and the assembled battery demand information whether to send the assembled battery 211a to a recycling process or to send the assembled battery 211a to a rebuilding process. The amount of usable single cells included in the assembled battery 211a is read from the storage unit 450. The assembled battery demand information is transmitted from the communication unit 460. In other words, the determination unit 470 determines the rebuild-candidate assembled battery 211a for one of an assembled battery that is used for rebuilding or an assembled battery that is recycled. The details of determination carried out by the determination unit 470 will be described later with reference to FIG. 7. Based on determination carried out by the determination unit 470, the assembled battery 211a is sent to the recycling process, the reusing process or the rebuilding process.

The display unit 480 shows the result of determination carried out by the determination unit 470. A worker is allowed to find which the assembled battery 211a should be sent to, the recycling process, the reusing process or the rebuilding process by referencing the details of a display on the display unit 480. The display unit 480 also shows the amount of usable single cells included in the assembled battery 211a.

Figure 4:
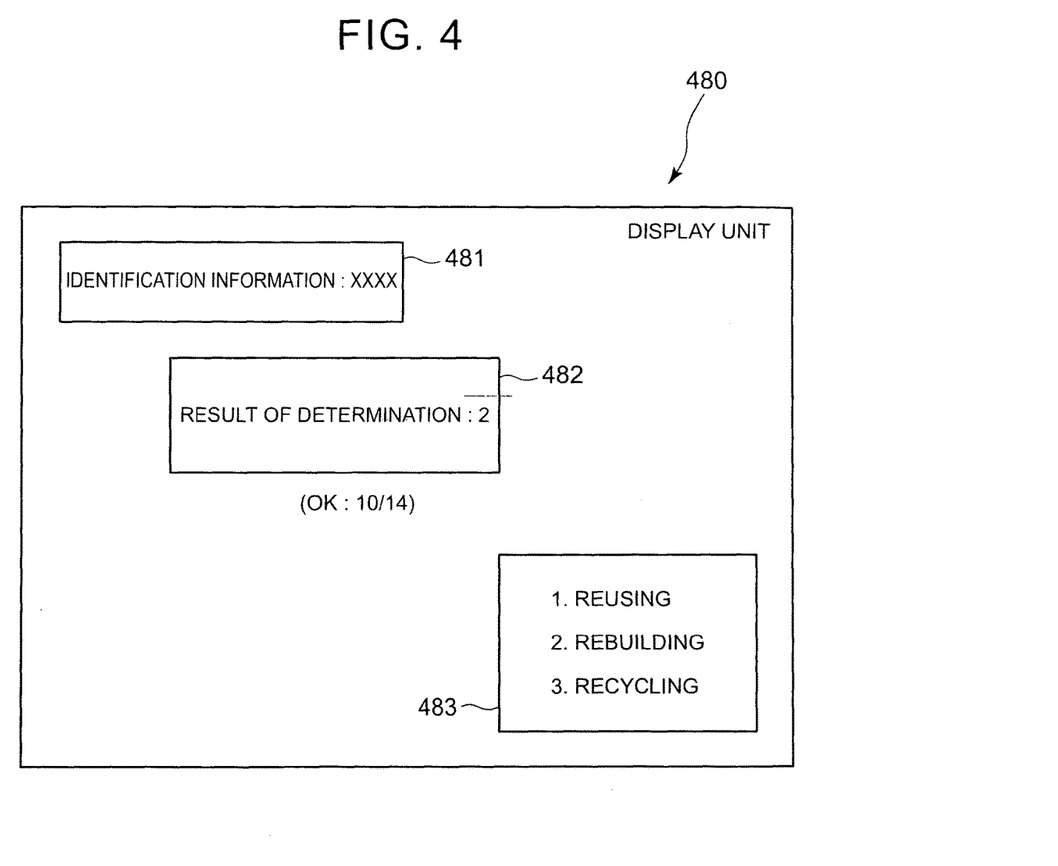
FIG. 4 is a view for illustrating an example of the details of a display on a display unit shown in FIG. 3.

FIG. 4 is a view for illustrating an example of the details of a display on the display unit 480 shown in FIG. 3. As shown in FIG. 4, the display unit 480 includes display windows 481, 482, 483. The display window 481 indicates the identification information of the assembled battery. The identification information is, for example, a serial number. The display window 482 indicates the result of determination. The result of determination is the result of determination carried out by the determination unit 470 and is indicated by any one of 1 to 3 numeric values. The display window 483 indicates description of numeric values of the result of determination. Here, the description indicates that 1 to 3 numeric values respectively correspond to reusing, rebuilding and recycling. The amount of usable single cells included in the assembled battery is indicated on the lower side of the display window 482. Here, "OK: 10/14" is shown. This means that ten battery blocks are usable among fourteen battery blocks included in the assembled battery. A user is allowed to find that, for example, the assembled battery is an assembled battery that is used for rebuilding and ten rebuilding-usable battery blocks are included in the assembled battery, by referencing the details of a display on the display unit 480.

When the user is able to acquire the assembled battery demand information by a certain method, the user is allowed to find not only the number of usable battery blocks included in the assembled battery but also demand for an assembled battery. Thus, instead of the determination unit 470, the user is able to determine whether to send the assembled battery to the recycling process or to send the assembled battery to the rebuilding process. For example, the user is allowed to find the assembled battery information from a display of the assembled battery demand information on the display unit 480.

Figure 5:
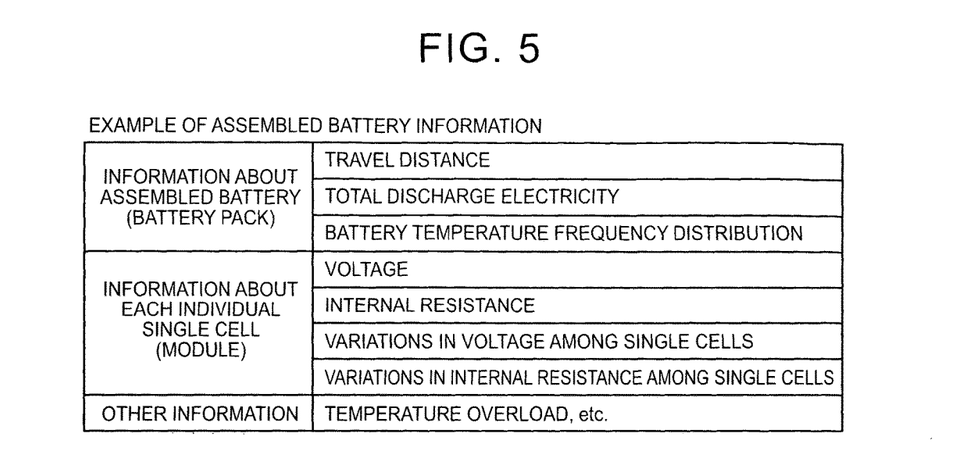
FIG. 5 is a view for illustrating an example of information about an assembled battery, which is stored in an assembled battery information acquisition unit shown in FIG. 3.

FIG. 5 is a view for illustrating an example of the assembled battery information that is stored in the assembled battery information collecting unit 300 shown in FIG. 1. As shown in FIG. 5, the assembled battery information is mainly classified into "information about an assembled battery (battery pack)", "information about each individual single cell (module)" and "other information".

The information about an assembled battery (battery pack) includes a travel distance, a total discharge electricity, a battery temperature frequency distribution, and the like. The information about each individual single cell (module) includes a voltage, an internal resistance, a variation in voltage among the single cells, and a variation in internal resistance among the single cells. The variation may be a difference between a maximum value and a minimum value, a variance, or the like. The other information includes a temperature overload, and the like. The temperature overload means, for example, a load on the assembled battery, which occurs because the assembled battery is placed at a temperature significantly different from an ordinary usage temperature.

The sorting apparatus 400 shown in FIG. 3 determines based on the assembled battery information shown in FIG. 5 whether the retrieved assembled battery is a rebuild candidate. In this determination, for example, it is determined whether each of three pieces of information, that is, the information about the assembled battery, the information about each individual single cell and the other information, satisfies a corresponding one of predetermined criteria. Determination as to whether the information about the assembled battery satisfies the predetermined criterion is carried out based on, for example, whether the travel distance is longer than or equal to a predetermined value. Determination as to whether the information about each individual single cell satisfies the predetermined criterion is carried out based on, for example, whether the voltage of each single cell falls within a predetermined range. Determination as to whether the other information satisfies the predetermined criterion is carried out based on, for example, whether a time during which the assembled battery is placed in a temperature overload state or the number of times the assembled battery has experienced a temperature overload is larger than or equal to a predetermined value. When all those three pieces of information satisfy the corresponding predetermined criteria, the assembled battery is determined to be reused. On the other hand, when the information about each individual single cell does not satisfy the corresponding predetermined criterion in all the single cells, the assembled battery is determined to be recycled. Otherwise, the assembled battery is determined as a rebuild candidate. For example, when the information about each individual single cell satisfies the corresponding predetermined criterion in some of the single cells among the single cells included in the assembled battery, the assembled battery can be determined as a rebuild candidate.

The assembled battery information shown in FIG. 5 can be collected by the assembled battery information collecting unit 300, or the like, shown in FIG. 1 in advance before the assembled battery is retrieved. Therefore, the sorting apparatus 400 shown in FIG. 1 is able to acquire the assembled battery information immediately (or easily) when the assembled battery is retrieved.

Figure 6:
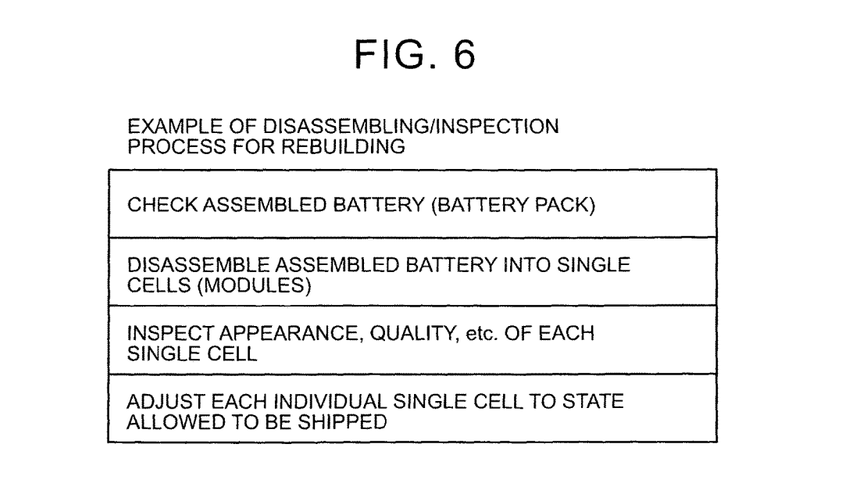
FIG. 6 is a view for illustrating an example of a disassembling/inspection process for rebuilding the assembled battery shown in FIG. 2.

FIG. 6 is a view for illustrating an example of a disassembling/inspection process for rebuilding. As shown in FIG. 6, initially, the assembled battery (battery pack) is checked. The assembled battery is identified by checking the assembled battery, and the amount of usable single cells included in the assembled battery is determined. At this time, which single cells are usable among the single cells included in the assembled battery can also be determined. After that, the assembled battery is disassembled into the single cells (modules). When the assembled battery is disassembled to the single cells, for example, appearance check, quality inspection, and the like, are carried out on each single cell. After that, the single cells on which appearance check and quality inspection have been completed are adjusted to a state where the single cell is allowed to be shipped. This adjustment, for example, includes attaching parts removed from each single cell in appearance check or quality inspection, adjustment of a remaining level, and the like. There are also single cells that are determined to be NG in appearance check or quality inspection. Such single cells are not allowed to be used, for rebuilding.

As shown in FIG. 6, the disassembling/inspection process for rebuilding includes an inspection process for obtaining information that cannot be collected in advance before the assembled battery is retrieved (or cannot be easily obtained), for example, the result of appearance check and quality inspection for each individual single cell. Such an inspection process is indispensable, and is one factor of an increase in cost for rebuilding an assembled battery. Reducing the amount (number) of the assembled batteries sent to such an inspection process leads to a cost reduction in rebuilding an assembled battery. The sorting apparatus 400 (FIG. 1) according to the embodiment determines whether to send the retrieved assembled battery to the rebuilding process, based on the amount of usable single cells included in the rebuild-candidate assembled battery and the assembled battery demand information. Thus, the sorting apparatus 400 is, for example, able to determine so that the amount of assembled batteries sent to the rebuilding process becomes a minimum required amount for satisfying demand for a rebuilt product. Through such determination, an appropriate amount of usable single cells are sent to the rebuilding process. The sorting apparatus 400 is able to determine to preferentially send an assembled battery to the rebuilding process in descending order of the amount of usable single cells among the plurality of retrieved assembled batteries. Through such determination, a minimum number of assembled batteries are sent to the rebuilding process.

Figure 7:
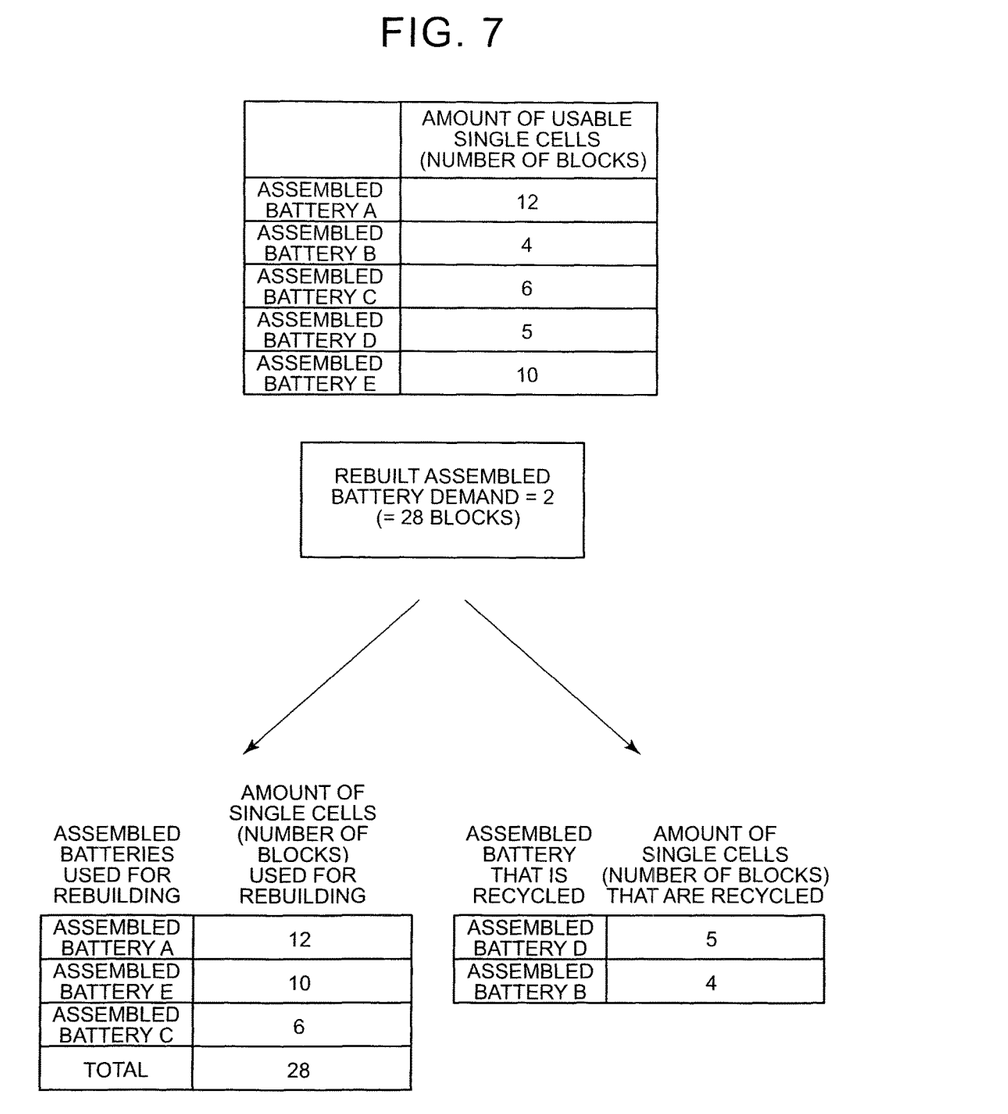
FIG. 7 is a view for illustrating an example of determination that is carried out by a determination unit shown in FIG. 3.

FIG. 7 is a view for illustrating an example of determination that is carried out by the determination unit 470 shown in FIG. 3. As shown in FIG. 7, for example, five assembled batteries, that is, the assembled battery A to the assembled battery E, are set as rebuild candidates. The amounts of usable single cells (the numbers of battery blocks) included in the assembled batteries A, B, C, D, E are respectively 12, 4, 6, 5, 10. On the other hand, the assembled battery demand, here; the assembled battery demand for a rebuilt product, is two. That is, the number of battery blocks that are required to newly manufacture a rebuilt assembled battery is 28.

In this case, the assembled batteries that are used for rebuilding are selected preferentially in descending order of the number of usable battery blocks. The assembled battery A has the highest priority, and the priority decreases in order of the assembled batteries E, C, D, B. The required number of battery blocks is twenty eight, and is satisfied with the usable battery blocks included in the assembled batteries A, E, C. Therefore, the assembled batteries A, E, C are determined as the assembled batteries that are used for rebuilding. On the other hand, the assembled batteries D, B are determined as the assembled batteries that are recycled. However, the assembled batteries D, B may not be recycled until a storage time limit, and may be stored as rebuild candidates. The assembled batteries may be disassembled in advance based on an available manufacturing capacity for the rebuilding process, stored in a state of single cells and, where necessary, used at the time of manufacturing an assembled battery.

Through the above-described determination of the determination unit 470, the assembled battery is preferentially sent to the rebuilding process in descending order of the number of usable battery blocks (or usable single cells). Thus, a necessary minimum number of the assembled batteries are sent to the rebuilding process. Therefore, the number of man-hours of, for example, disassembling the assembled batteries in the rebuilding process is minimized, and work in the rebuilding process becomes efficient.

Figure 8:
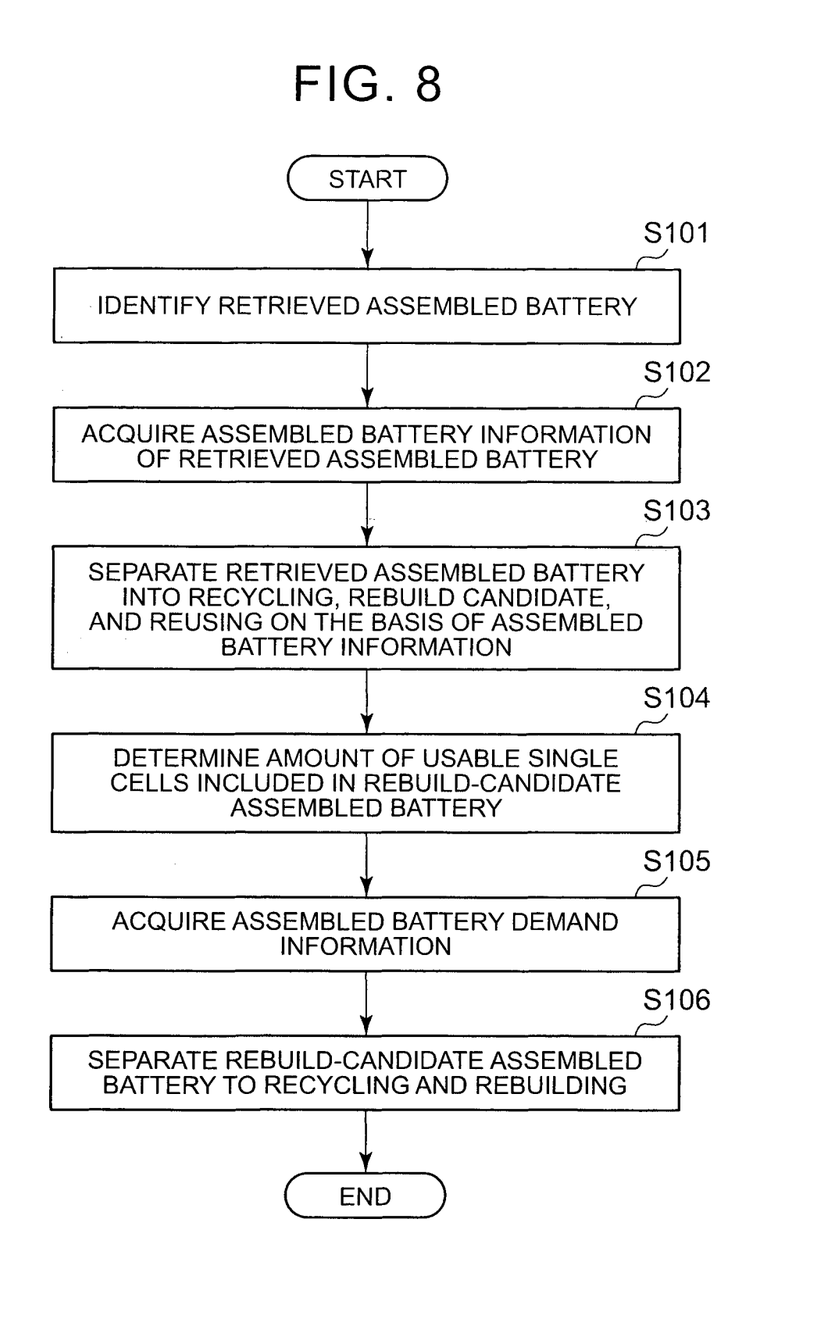
FIG. 8 is a flowchart for illustrating processing that is executed in the assembled battery reusing system according to the embodiment.

FIG. 8 is a flowchart for illustrating processing that is executed in the assembled battery reusing system according to the embodiment. This flowchart is executed by the sorting apparatus 400 shown in FIG. 1 and/or FIG. 2.

As shown in FIG. 3 and FIG. 8, initially, a retrieved assembled battery is identified (step S101). Subsequently, the assembled battery information of the assembled battery identified in step S101 is acquired (step S102). After that, the retrieved assembled battery is separated to any one of recycling, rebuild candidate and reusing based on the assembled battery information acquired in step S102 (step S103). That is, it is determined whether the retrieved assembled battery is recycled, reused or determined as a rebuild candidate.

The assembled battery that has passed the process of step S103 can be, for example, stored in a warehouse, or the like, for a set period. That is, during the set period, the assembled battery that has passed the process of step S103 is successively stored in the warehouse. The set period is a period during which the communication unit 460 shown in FIG. 3 periodically acquires the latest assembled battery demand information, and is, for example, about several days to several weeks.

The amount of usable single cells included in each of the assembled batteries determined as rebuild candidates in step S103 is determined (step S104). Subsequently, demand for manufacturing a new assembled battery, that is, the assembled battery demand information, is acquired (step S105). After that, it is determined whether each of the rebuild-candidate assembled batteries should be recycled or used for rebuilding (step S106), and then the flowchart ends.

Lastly, the embodiment of the invention is summarized. As shown in FIG. 1 and FIG. 3, the assembled battery reusing system 100 according to the embodiment of the invention includes the assembled battery information acquisition unit (communication unit 420), the assembled battery demand information acquisition unit (communication unit 460), the rebuild candidate determining unit 430, the single cell amount determining unit 440, and the determination unit 470. The assembled battery information acquisition unit (communication unit 420) acquires the assembled battery information. The assembled battery demand information acquisition unit (communication unit 460) acquires the amount of rebuilding-required single cells required to rebuild a required new assembled battery. The rebuild candidate determining unit 430 determines based on the assembled battery information whether the retrieved assembled battery is a rebuild candidate. The assembled battery information is acquired by the assembled battery information acquisition unit (communication unit 420). The single cell amount determining unit 440 determines the amount of rebuilding-usable single cells included in the rebuild-candidate assembled battery determined by the rebuild candidate determining unit 430. The determination unit 470 determines based on the amount of rebuilding-usable single cells and the amount of rebuilding-required single cells whether to send the rebuild-candidate assembled battery to the rebuilding process. The amount of rebuilding-usable single cells is determined by the single cell amount determining unit 440. The amount of rebuilding-required single cells is acquired by the assembled battery demand information acquisition unit (communication unit 460). Thus, it is possible to send only an appropriate amount of assembled batteries to the rebuilding process. As a result, only a necessary minimum amount of assembled batteries are used for rebuilding, so it is possible to reduce cost associated with rebuilding of an assembled battery.

As shown in FIG. 5, the assembled battery information may be collectable in advance before the assembled battery is retrieved. As shown in FIG. 6, the rebuilding process may include the inspection process for obtaining information that is not included in the assembled battery information, and such work takes time and cost; however, such cost can be reduced according to the embodiment.

As shown in FIG. 1, FIG. 3 and FIG. 7, the assembled battery reusing system 100 may further include the storage unit 450. The storage unit 450 stores the amount of rebuilding-usable single cells included in each individual rebuild-candidate assembled battery of the plurality of rebuild-candidate assembled batteries (the assembled battery A to the assembled battery E). The amount of rebuilding-usable single cells may be determined by the single cell amount determining unit 440. The determination unit 470 may determine based on the amount of rebuilding-usable single cells of a corresponding one of the rebuild-candidate assembled batteries (the assembled battery A to the assembled battery E) and the amount of rebuilding-required single cells whether to send each individual rebuild-candidate assembled battery of the plurality of rebuild-candidate assembled batteries to the rebuilding process. The amount of rebuilding-usable single cells of the corresponding one of the rebuild-candidate assembled batteries (the assembled battery A to the assembled battery E) may be stored in the storage unit 450. In addition, the determination unit 470 may determine to preferentially send the assembled battery to the rebuilding process in descending order of the amount of rebuilding-usable single cells among the plurality of rebuild-candidate assembled batteries. Thus, a necessary minimum amount of assembled batteries are sent to the rebuilding process, so work in the rebuilding process is efficient.

As shown in FIG. 3, the apparatus (sorting apparatus 400) according to the embodiment includes an information acquisition unit (communication unit 420), the rebuild candidate determining unit 430, the single cell amount determining unit 440, and the determination unit 470. The information acquisition unit (communication unit 420) acquires the assembled battery information. The rebuild candidate determining unit 430 determines based on the assembled battery information acquired by the information acquisition unit (communication unit 420) whether the retrieved assembled battery is a rebuild candidate. The single cell amount determining unit 440 determines the amount of rebuilding-usable single cells included in the rebuild-candidate assembled battery determined by the rebuild candidate determining unit 430. The determination unit 470 determines based on the amount of rebuilding-usable single cells and the amount of rebuilding-required single cells whether to send the rebuild-candidate assembled battery to the rebuilding process. The amount of rebuilding-usable single cells is determined by the single cell amount determining unit 440. The amount of rebuilding-required single cells is required to rebuild a required new assembled battery.

The invention claimed is:

1. An assembled battery reusing system for reusing an assembled battery including a plurality of single cells, the assembled battery reusing system comprising:
   a sorting apparatus configured to determine whether to send a retrieved assembled battery to a rebuilding process; and
   a controller that is provided in the sorting apparatus, the controller programmed to:
   (a) acquire information about the assembled battery;
   (b) determine whether a retrieved assembled battery is a rebuild candidate based on the acquired information about the assembled battery;
   (c) determine an amount of rebuilding-usable single cells included in the determined rebuild-candidate assembled battery;
   (d) acquire an amount of rebuilding-required single cells required to rebuild a required new assembled battery; and
   (e) determine after determining the amount of rebuilding-usable single cells and acquiring the amount of rebuilding-required single cells, based on the amount of rebuilding-usable single cells and the amount of rebuilding-required single cells, whether to send the rebuild candidate assembled battery to a rebuilding process.

2. The assembled battery reusing system according to claim 1, wherein
   the information about the assembled battery is collectable in advance before the assembled battery is retrieved, and
   the rebuilding process includes an inspection process for obtaining information that is not included in the information about the assembled battery.

3. The assembled battery reusing system according to claim 1, further comprising:
   a storage unit configured to store the amount of rebuilding-usable single cells included in each individual rebuild-candidate assembled battery of a plurality of the rebuild-candidate assembled batteries, wherein the controller is programmed to determine based on the amount of rebuilding-usable single cells of a corresponding one of the rebuild-candidate assembled batteries and the amount of rebuilding-required single cells whether to send each individual rebuild-candidate assembled battery of a plurality of the rebuild-candidate assembled batteries to the rebuilding process, and the amount of rebuilding-usable single cells of the corresponding one of the rebuild-candidate assembled batteries is stored in the storage unit.

4. The assembled battery reusing system according to claim 3, wherein
the controller is programmed to determine to preferentially send the assembled battery to the rebuilding process in descending order of the amount of rebuilding-usable single cells among the plurality of the rebuild-candidate assembled batteries.

5. An apparatus that is used in an assembled battery reusing system for reusing an assembled battery including a plurality of single cells, the apparatus comprising:
a sorting apparatus configured to determine whether to send a retrieved assembled battery to a rebuilding process; and
a controller that is provided in the sorting apparatus, the controller programmed to:
(a) acquire information about the assembled battery;
(b) determine whether a retrieved assembled battery is a rebuild candidate based on the acquired information about the assembled battery;
(c) determine an amount of rebuilding-usable single cells included in the determined rebuild-candidate assembled battery;
(d) acquire an amount of rebuilding-required single cells required to rebuild a required new assembled battery; and
(e) determine after determining the amount of rebuilding-usable single cells and acquiring the amount of rebuilding-required single cells, based on the amount of rebuilding-usable single cells and the amount of rebuilding-required single cells, whether to send the rebuild candidate assembled battery to a rebuilding process.

6. The assembled battery reusing system according to claim 1, wherein the predetermined criterion includes a time period during which the assembled battery is placed in a temperature overload state or the number of times the assembled battery has experienced a temperature overload is larger than or equal to a predetermined value.

7. The assembled battery reusing system according to claim 1, wherein the predetermined criterion includes a travel distance in which a vehicle the assembled battery is installed is longer than or equal to a predetermined value.

* * * * *